United States Patent [19]
Aleem

[11] 3,786,696
[45] Jan. 22, 1974

[54] STARTER-DRIVE

[75] Inventor: Mohammed A. Aleem, Rockford, Ill.

[73] Assignee: Sundstrand Corporation, Rockford, Ill.

[22] Filed: Sept. 11, 1972

[21] Appl. No.: 288,153

[52] U.S. Cl.................. 74/687, 60/39.14, 74/810, 417/213
[51] Int. Cl. ..................... F16h 47/04, F02c 7/26
[58] Field of Search ............. 74/687, 810; 417/213; 60/39.14

[56] References Cited
UNITED STATES PATENTS

| | | | |
|---|---|---|---|
| 3,274,855 | 9/1966 | Reynolds et al. | 74/687 |
| 3,722,324 | 3/1973 | Cordner et al. | 74/687 |
| 3,733,924 | 5/1973 | Zentz et al. | 74/687 |
| 3,735,646 | 5/1973 | Roberts | 74/687 |

FOREIGN PATENTS OR APPLICATIONS

| | | | |
|---|---|---|---|
| 1,199,145 | 7/1970 | Great Britain | 74/810 |

*Primary Examiner*—Allan D. Herrmann
*Attorney, Agent, or Firm*—Axel A. Hofgren et al.

[57] ABSTRACT

A starter-drive for use between an aircraft engine and a generator to transmit power in either direction between the engine and the generator, for driving the engine from the generator in a starting mode, and for driving the generator from the engine in a generating mode, including, a generator shaft, an engine shaft, a differential for transmitting power from the engine shaft to the generator shaft, a hydrostatic transmission including one hydraulic unit connected for rotation with the generator shaft, and a second hydraulic unit connected for rotation with a control gear in the differential, a first one-way clutch connecting the second hydraulic unit to drive the engine shaft exclusively through the hydrostatic transmission during starting, a second one-way clutch connecting the engine shaft to the differential to transmit power from the engine to the generator after the engine is started, and means for varying the displacement of one of the hydraulic units to bring the engine shaft up to speed during the starting mode and to add or subtract speed in the differential during the generating mode.

9 Claims, 4 Drawing Figures

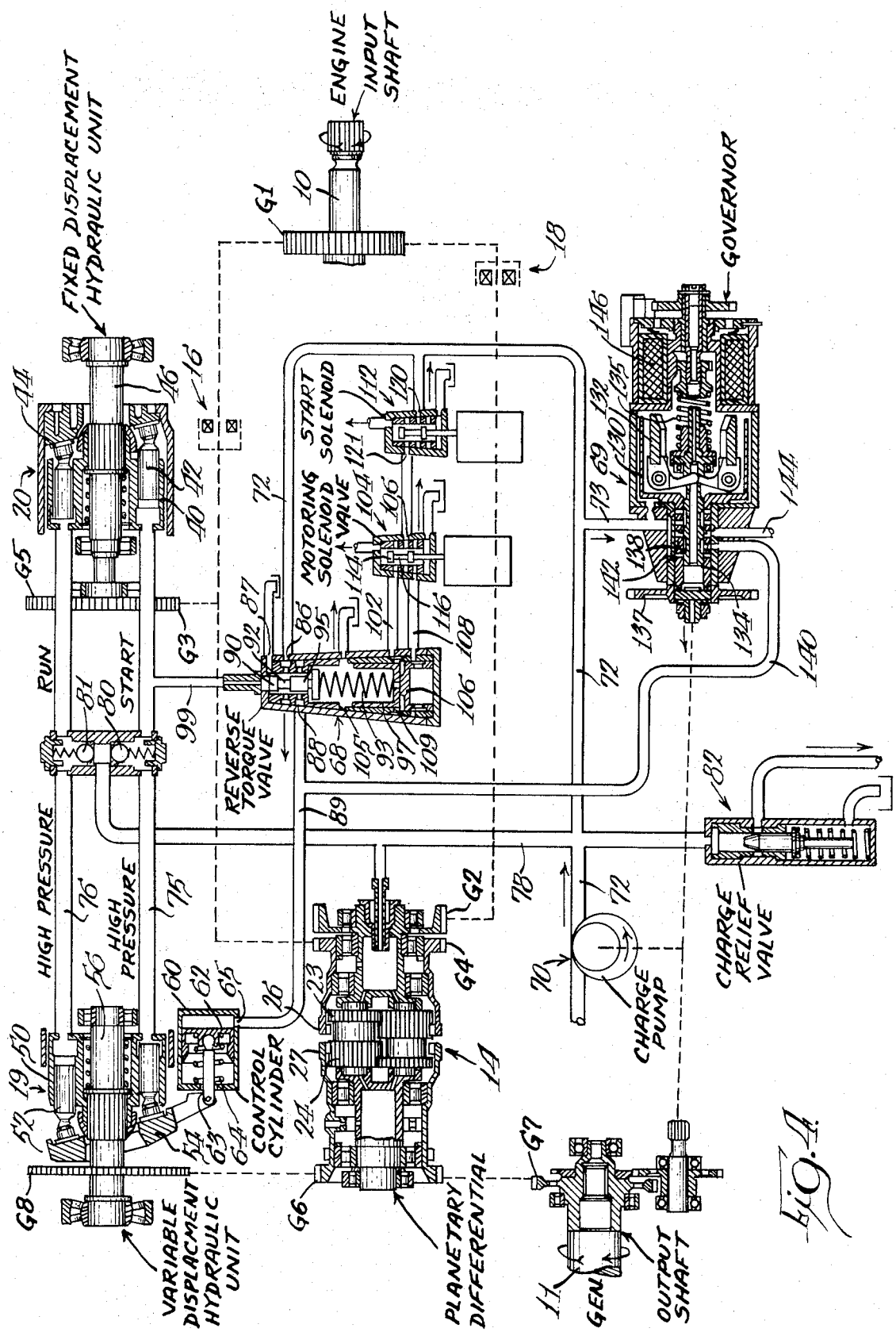

STARTER-DRIVE

BACKGROUND OF THE INVENTION

This invention relates to a system commonly referred to as a starter-drive for use between an aircraft engine and a generator so that the generator may be utilized as an electric motor to start the engine, after which the engine is utilized for driving the generator at a constant speed despite variations in the speed of the engine.

Prior U. S. Pat. No. 3,274,855 relates to a starter-drive system including a hydrostatic transmission and a mechanical differential in an arrangement wherein the generator shaft is connected to a variable displacement hydraulic unit in the hydrostatic transmission and to one element in the differential. A second gear element in the differential is connected to the engine shaft, and the second hydraulic unit in the hydrostatic transmission is connected to the control gear in the differential. Such system operates in a highly desirable fashion in that the generator may be accelerated to its synchronous speed with a minimum load before it is utilized as an induction motor to start the engine. Thereupon, the engine is started with a minimum of losses and ultimately the system has an acceptable efficiency when operating at a constant speed transmission during the generating mode. However, both hydraulic units in the hydrostatic transmission are of variable displacement construction for the reason that both are rotated while the generator is accelerated to synchronous speed preparatory to starting and the displacement of the units should be adjusted to zero in order to reduce the load on the generator while accelerating. Additionally, the system requires relatively large hydraulic units to obtain the desired starting mode because the hydrostatic transmission operates through the differential.

Prior British Pat. No. 1,199,145 relates to a starter-drive system utilizing a mechanical gear differential in association with a Perbury transmission in an arrangement wherein the starting mode is obtained by operating the generator as a motor to supply starting power to the engine through the Perbury transmission and the mechanical differential. During the generating mode, power is transmitted from the engine to the generator through the Perbury transmission only. In the starting mode, power is transmitted from the differential to the engine through a one-way clutch, and in the generating mode, power is transmitted from the engine to the Perbury transmission through a second one-way clutch which bypasses the differential. While the Perbury transmission is reversible, it has the disadvantage that it is difficult to obtain zero output with the input rotating, because of the difficulty of adjusting the rollers in the transmission to that extent. Further, in the arrangement described, the gears in the differential, though nominally unloaded during the generating mode, are actively rotating, as a result of which there is undesirable wear while the gearing is not utilized.

SUMMARY OF THE PRESENT INVENTION

It is a general object of the present invention to provide a new and improved starter-drive utilizing a mechanical gear differential and a hydrostatic transmission between the generator shaft and the engine shaft.

According to the present invention, the hydrostatic transmission includes a variable displacement unit adjacent the generator shaft and a fixed displacement unit adjacent the engine shaft. The differential includes a first gear rotating with the generator shaft, a control gear rotating with the fixed displacement hydraulic unit, and a third gear rotatable with the engine shaft. A first one-way clutch is utilized between the fixed displacement hydraulic unit and the engine shaft to bypass the differential during the starting mode. During the generating mode, a second one-way clutch is utilized between the engine shaft and the differential for transmitting most of the power from the engine to the generator through the mechanical gearing, while the hydrostatic transmission is utilized for adding or subtracting speed in the differential to maintain a constant output.

The preferred arrangement as described allows for unloading the generator while it is brought up to speed preparatory to the starting mode because the variable hydraulic unit adjacent the generator shaft may be placed at zero displacement. Further, the hydrostatic transmission has low losses during the starting mode and the size of the hydraulic units may be reduced substantially. Additionally, the arrangement provides for acceptable efficiency during the generating mode when most of the power is transmitted through the mechanical differential.

Another object is to provide a new and improved starter-drive of the type described including a first conduit connecting the hydraulic units for supplying high pressure fluid from the first hydraulic unit to the second hydraulic unit during the starting mode, a second conduit connecting the hydraulic units for supplying high pressure fluid from the second hydraulic unit to the first hydraulic unit during the generating mode, a control valve responsive to pressure in the first conduit and controlling the variable displacement hydraulic unit to limit the pressure in the first conduit, and means for establishing a high pressure setting on the control valve during the starting mode and a low pressure setting during the generating mode.

It is also an object of the invention to provide a new and improved starter-drive of the character mentioned including a governor valve responsive to speed of the generator shaft and controlling the displacement varying means during the generating mode to provide constant generator speed regardless of variation in the speed of the engine, together with selectively operable bias means controlling the governor valve during the starting mode to vary the displacement of the variable hydraulic unit to bring the engine shaft up to speed.

Other objects and advantages will become apparent from the following description taken in connection with the accompanying drawings.

FIG. 4 is a hydraulic circuit diagram of the starter-drive.

DETAILED DESCRIPTION OF PREFERRED EMBODIMENT

According to the present invention, use is made of an installed alternating current generator in an aircraft as a starter motor for cranking an aircraft engine. The generator is accelerated as an induction motor, with little or no connected load so that heating of the generator is minimized. At a predetermined speed, the generator is operated as a synchronous motor to deliver power for engine starting. The power is programmed through an infinitely variable hydrostatic transmission. Once the engine is up to idle speed, the drive functions for transmitting power from the engine to the generator to drive the latter at a constant speed regardless of variations in engine speed and load.

The transmission provides a high degree of flexibility required for transmitting controlled torque in either direction between an engine and a generator. It provides for engine starting from a 400 Hz 115 volt supply, and constant speed generator drive for 400 Hz generating system of 90-135 KVA suitable for use in all major airborne constant frequency generator systems for military and commercial aircraft.

Figure 1:
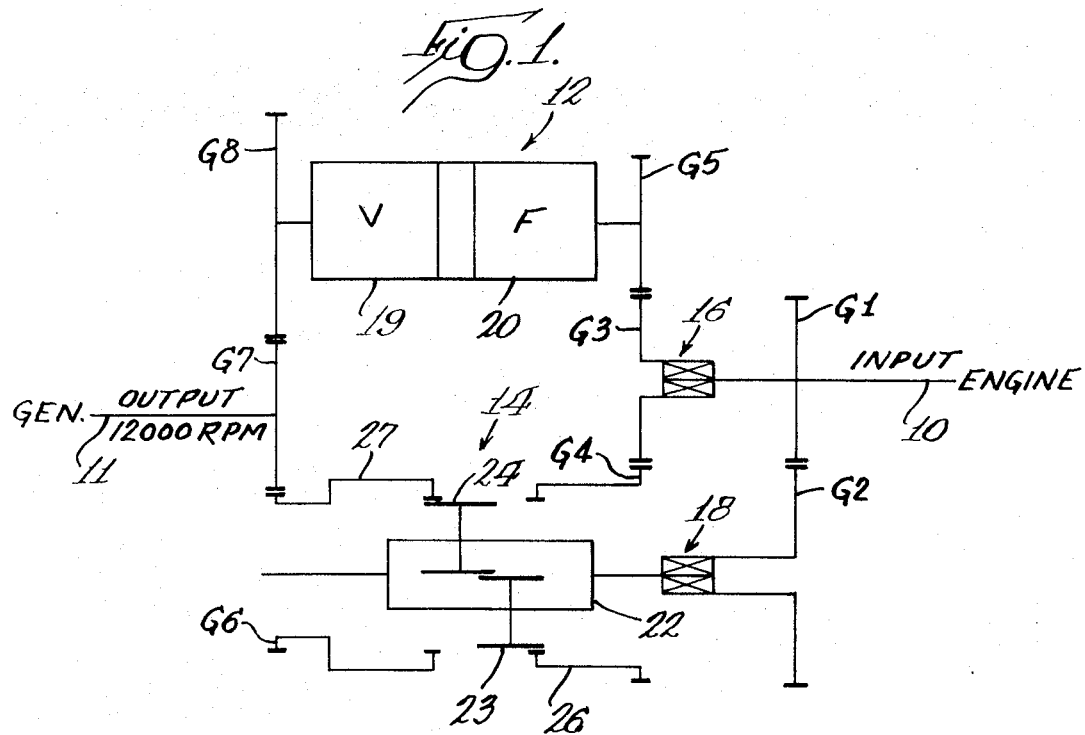
FIG. 1 is a diagrammatic illustration of the mechanical components of a starter-drive embodying the principles of the present invention.

The functional arrangement of the various elements is illustrated diagrammatically in FIG. 1. As illustrated there, a shaft 10 is adapted to be connected with an engine and a shaft 11 is adapted to be connected with a generator. The two shafts are interconnected by a drive embodying the principles of the present invention including a hydrostatic transmission 12, a mechanical differential 14, an overrunning clutch 16 which drives the engine during the starting mode and an overrunning clutch 18 which drives the differential during the generating mode. The hydrostatic transmission 12 includes a variable displacement hydraulic unit 19 and a fixed displacement hydraulic unit 20 interconnected in closed hydraulic circuit. During the generating mode, when the generator is driven by the engine, power is supplied from the engine through the one-way clutch 18 and the differential 14 while the hydrostatic transmission is utilized to add or subtract speed in the differential for purposes of maintaining constant output speed at the shaft 11. During the starting mode, the generator is utilized to drive the engine through the hydrostatic transmission 12 and the one-way clutch 16.

As illustrated diagrammatically in FIG. 1, the differential 14 includes a central carrier 22 including a pair of pinions 23 and 24 rotatable thereon and meshing with each other. Additionally, the pinion 23 engages a ring gear 26, and the pinion 24 engages a ring gear 27. During the generating mode, the power train from the input shaft 10 to the output shaft 11 includes a gear G1 on the input shaft meshing with a gear G2 which drives one-way clutch 18 in turn driving the carrier 22 in the differential. Assuming the ring gear 26 is held stationary, rotation of the carrier 22 causes rotation of the ring gear 27 which has an integral pinion G6 driving a gear G7 on the generator shaft 11.

In order to maintain constant output speed at the generator shaft 11 in spite of variations in the input speed at the engine shaft 10, the hydrostatic transmission 12 is utilized to add or subtract speed in the differential as may be necessary. To this end, the gear G7 on the generator shaft meshes with a gear G8 rotatable with the variable hydraulic unit 19. A gear G5 rotatable with the fixed hydraulic unit 20 meshes with a gear G3 in turn meshing with a gear G4 integral with the ring gear 26 in the differential. Gear G3 drives the one-way clutch 16 on the engine shaft 10 for purposes of transmitting power to the engine during the starting mode.

In the starting mode, when the generator is operated as an electric motor, power is transmitted from the generator shaft 11 to the variable hydraulic unit 19 which functions as a pump supplying fluid under pressure to the fixed hydraulic unit 20 which functions as a motor to drive the engine shaft 10 through the one-way clutch 16 while the carrier 22 overruns the gear G2 by virtue of the clutch 18. Thus in this mode of operation, the power is transmitted entirely through the hydrostatic transmission. During the starting mode, the generator shaft 11 is driven at substantially constant speed and the engine shaft 10 is accelerated by placing the variable hydraulic unit 19 into stroke.

During the generating mode, the engine shaft 10 drives the generator shaft 11 through the one-way clutch 18 and the differential 14, and the input shaft 10 overruns the gear G3 by virtue of the clutch 16. The variable hydraulic unit is driven at constant speed by the gearing G7, G8, and the fixed hydraulic unit 20 is connected by gears G5 and G3 to rotate with gear G4 and ring gear 26 which function as the control gear in the differential. During the initial phases of constant speed generator drive, when the input speed at the engine shaft is relatively low, the variable unit 19 functions as a pump and the fixed unit 20 functions as a motor which adds speed to the differential. At high speed of the engine shaft 10, the fixed unit 20 functions as a pump in a manner to subtract speed from the differential.

Figure 2:
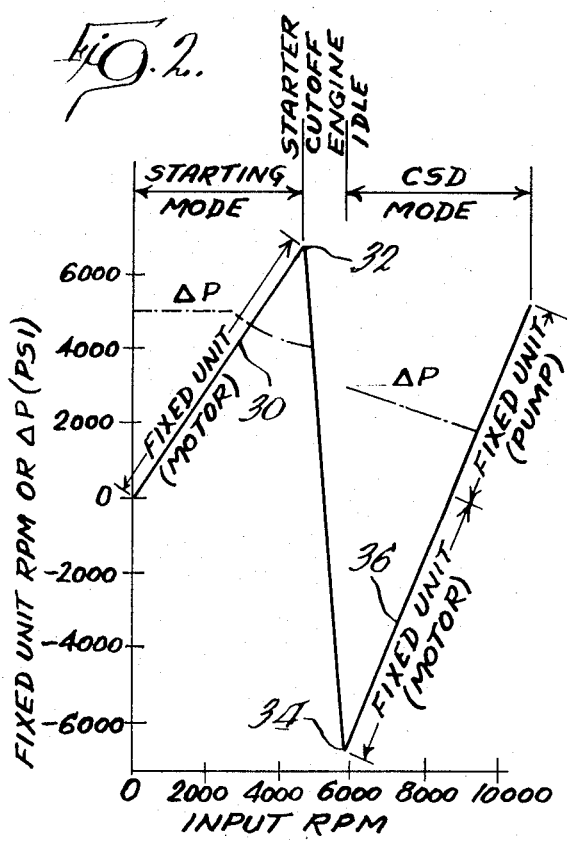
FIG. 2 is a graph illustrating the speed and direction of rotation of the fixed hydraulic unit in the transmission illustrated in FIG. 1.
Figure 3:
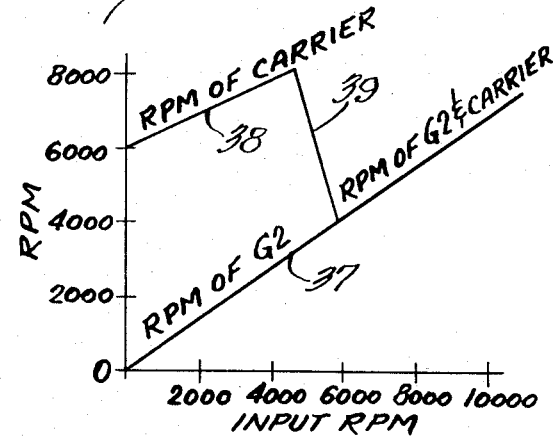
FIG. 3 is a graph illustrating the speed of rotation of the input and control gearing in the differential.

The operation of the drive is illustrated in the graphs of FIGS. 2 and 3. Referring to FIG. 2, note that on initiation of the starting mode, the fixed unit is stationary. As the variable unit is put into stroke, the fixed unit rotates and power is transmitted to the engine shaft 10 at increasing speed as illustrated by the line 30 in FIG. 2. When the engine attains a speed sufficient to sustain itself, the starting mode is concluded, as indicated at the point 32 in FIG. 2, at which time the displacement of the variable unit is reversed from full displacement in one direction to full displacement in the opposite direction, and this results in rotating the fixed unit at maximum speed in a negative direction as indicated at the point 34 in FIG. 2, which corresponds to engine idle speed. In the constant speed generating mode, when the engine speed is in the low range, the variable unit 19 functions as a pump and the fixed unit 20 adds speed to the differential as represented by the lower portion of the line 36 in FIG. 2. As the engine speed increases, the displacement of the variable unit is reduced, and the speed of the fixed unit is gradually reduced to zero, at which time the control gear 26 is held stationary in the differential and the drive is entirely mechanical from the engine shaft 10 to the generator shaft 11. When the speed of the engine shaft exceeds that necessary to provide the desired output speed, the fixed unit is driven by the differential to subtract speed from the differential, as represented by the upper half of the line 36 in FIG. 2.

Referring to FIG. 3, the acceleration of the gear G2 is represented by line 37. The gear G2 rotates proportional to rotation of the engine shaft 10 so that the line 37 also indicates the gradual straight-line acceleration of the engine shaft 10 from the beginning of the starting mode through the generating mode. During the starting mode, the carrier 22 overruns the gear G2 as illustrated by the line 38. However, in the transition from the starting mode to the generating mode, the speed of the carrier drops substantially as represented by the line 39, whereupon it is picked up by the clutch 18 and thereafter rotates with the gear G2 during the generating mode, as illustrated by the upper portion of line 37.

While the exact speeds of the gears G3 and G4 are not illustrated in FIGS. 2 and 3, it will be understood that the speed of such gears varies proportionally with the speed of the fixed unit as illustrated in FIG. 2.

Referring now to FIG. 4, it will be noted that the hydraulic units 19 and 20 are preferably of an axial piston type. The fixed displacement unit 20 includes a rotatable cylinder block 40 having an annular series of axially disposed cylinders with reciprocable pistons 42. The pistons have spherical ends engaged with bearing shoes reacting on a stationary cam or swashplate 44. The cylinder block 40 is splined on a shaft 46 carrying the gear G5.

The variable displacement hydraulic unit 19 includes a rotatable cylinder block 50 having an annular series of axially disposed cylinders with reciprocable pistons 52. The pistons have spherical ends carrying bearing shoes reacting against a pivotally mounted swashplate 54 which is movable in opposite directions from the neutral central position to vary the displacement to maximum values in opposite directions from zero. The cylinder block 50 is splined on a rotatable shaft 56 carrying the gear G8.

Displacement of the variable unit 19 is controlled by a displacement varying means including a control cylinder 60 having a reciprocable piston 62 connected by a rod 63 to the variable angle swashplate 54. A coiled compression spring 64 in the cylinder urges the swashplate 54 toward a maximum displacement position in one direction. Fluid under pressure may be supplied to the end of the control cylinder 60 through a port 65 for moving the swashplate against the bias of the spring 64.

Control fluid is supplied to the control cylinder 60 under control of a reverse torque valve 68 or a speed responsive governor 69. A charge pump is provided at 70 for supplying control fluid under pressure to the reverse torque valve 68 and the governor valve 69. The charge pump 70 delivers control fluid under pressure to a conduit 72 which leads to the reverse torque valve 68. The conduit 72 communicates with the governor valve 69 through a passage 73.

The variable displacement unit 19 and the fixed displacement unit 20 are interconnected in a closed hydraulic circuit by means of a first conduit 75 and a second conduit 76. The conduit 75 supplies fluid under pressure from the variable unit 19 to the fixed unit 20 during the starting mode. The conduit 76 conducts high pressure between the hydraulic units during operation in the generating mode. The charge pump 70 supplies makeup fluid to the circuit connecting the units 19 and 20 by means of a conduit 78 which leads to a pair of spring-biased check valves 80 and 81 leading respectively to the conduits 75 and 76. It will be understood that high pressure in one of the conduits 75 and 76 will maintain the associated check valve closed, while low pressure in the other conduit will permit the associated check valve to be opened for admission of makeup fluid from the charge pump 70. The pressure of charge fluid is controlled by an appropriate relief valve 82 communicating with the charge pump outlet.

The reverse torque valve 68 includes a charge port 86 communicating with the charge conduit 72, a drain port 87, and a control port 88 communicating with a conduit 89 leading to the control cylinder 60. Communication between the supply port 86 and the control port 88 is controlled by a reciprocable valve member 90 having a reduced stem portion 92. The valve member 90 is biased by a spring 93 to the position illustrated, in which a valve stem portion 95 blocks communication between the ports 86 and 88. The spring 93 is seated in a cup-shaped piston-like member 97 which is adapted to be adjusted for purposes of varying the compression of the spring 93. In operation, the torque valve 68 senses the pressure of fluid in conduit 75 through the medium of a passage 99 leading to the upper end of the valve member 90.

In order to vary the setting on the spring 93, the spring seat 97 is adjustable in the valve housing by means of fluid under pressure acting against the lower end of the valve seat. In particular, control fluid under pressure may be supplied to the lower end of the valve seat 97 through a passage 102 leading from a motoring solenoid valve 104. When fluid is supplied to the lower end of the spring seat 97 through passage 102, the spring seat is movable upwardly to a position where the upper end contacts a stop 105. At that time, the spring is set at the highest compression.

The spring seat 97 abuts a piston 106, and fluid may be supplied to the lower end of the piston 106 through a passage 108 leading from the motoring solenoid valve 104. When fluid is supplied to the lower end of piston 106, it is movable upwardly in the valve housing to a position where it engages a stop 109. Such movement has the effect of moving the spring seat to an intermediate position where the compression of the spring 93 is less than maximum and more than the minimum compression which exists when the parts are positioned as illustrated in FIG. 4.

In operation, the high compression setting is placed on the spring 93 during the starting mode, and the low compression setting is utilized during the generating mode. If it is desired to turn the engine over without starting, the intermediate spring compression may be utilized. It will be understood that the torque valve member 90 senses the pressure in the conduit 75, and when the pressure exceeds the setting of the spring, the valve member 90 is movable to communicate the charge fluid passage 72 with the control passage 89 to supply fluid under pressure to the cylinder 60 for adjustment of the swashplate in a manner to reduce the pressure in the conduit 75. At the same time, excess pressure in conduit 75 is relieved through drain port 87.

The setting of the spring 93 is controlled by the motoring solenoid valve and a start solenoid valve 112. The motoring solenoid valve includes a port 106 for receiving charge fluid from the start solenoid valve 112. Fluid from the port 106 is supplied selectively to the passage 102 or passage 108 by a valve member 114 with a reduced stem portion 116. The valve member is normally positioned as illustrated to communicate the port 106 with the passage 102, so that when the start solenoid valve 112 is energized, the spring seat 97 is moved to the high compression position. When the motoring solenoid valve is energized, the reduced stem portion 116 is moved downwardly to a place where it communicates the port 106 with the passage 108 to move the spring seat to the intermediate position.

The start solenoid valve 112 includes a port 120 for receiving charge fluid from the conduit 72, and a port 121 communicating with the motoring solenoid valve 104. A valve stem in the valve 112 is normally positioned to block communication between the ports 120 and 121. Upon energization of the valve 112, the stem is moved to the position illustrated where the ports 120 and 121 communicate to deliver charge fluid to the motoring valve 104. Thus, when the start solenoid valve is energized alone, a high pressure setting is placed on the torque valve 68. When both the motoring valve 104 and the start valve 112 are energized, the intermediate setting is placed on the torque valve 68. When neither valve is energized, the low pressure setting is utilized in the valve 68.

The governor valve mechanism 69 includes a rotatable head 130 with pivoted flyweights 132 having crank arms adapted to control the axial position of a valve stem 134 which is normally biased toward the left as viewed in FIG. 4 by a spring 135. The rotatable head 130 is driven by a gear 137 thereon which is rotatable with the generator shaft 11, so that the governor is responsive to the speed of the generator shaft. The valve stem 134 includes an annular groove 138 which communicates with a passage 140 leading from the governor to the control cylinder 60. When the valve stem 134 is moved to the left as viewed in FIG. 4, the control groove 138 is placed in communication with a charge pressure port 142 to supply control fluid to the control cylinder 60. When the valve stem 134 is moved toward the right in FIG. 4, the control groove 138 places the control cylinder 60 in communication with a drain passage 144 so that fluid is exhausted from the control cylinder 60.

The governor mechanism includes a magnetic trim control in the form of an electrical coil 146 positioned adjacent the flyweights 132 in a manner to alter the effect of centrifugal force so as to permit imposition of an artificial control on the valve stem 134 responsive to variation of current in the coil. In the starting mode, while the generator shaft is rotating at a constant speed as the input shaft, the trim coil 146 is utilized to program the movement of the valve stem 134 controlling the cylinder 60 in a manner to increase displacement of the variable unit from neutral toward the position illustrated in FIG. 4 for purposes of bringing the engine shaft up to a speed at which the engine can become self-sustaining.

In operation of the system as described above, the starting sequence is initiated by a switch available to the pilot in an aircraft cockpit. The generator rotating field is shorted, establishing the generator as an induction motor. The generator accelerates as an induction motor to a predetermined speed. At the predetermined speed, the generator control initiates field control of the generator to provide synchronous motor operation. When the synchronous motor condition is attained, a signal is provided to the start solenoid valve to initiate engine cranking.

As the generator initiates rotation of the generator shaft 11, the charge pump 70 driven thereby develops pressure in the conduits 72 and 78 which is relieved across the reverse torque valve 68 and the governor valve 69. In this interim, the variable displacement hydraulic unit 19 is held at zero displacement.

When the signal is provided to energize the start solenoid valve 112, a signal is also provided in the generator control for programming the magnetic trim device 146 in a manner to move the variable unit into stroke in the direction illustrated in FIG. 4. As the rotating unit 19 is placed into stroke, it provides fluid flow and pressure to the fixed displacement hydraulic unit to initiate rotation of the latter and the engine shaft. The pressure of working fluid in the conduit 75 during the starting operation is controlled by the reverse torque valve 68. Energization of the start solenoid valve 112 supplies fluid under pressure to the reverse torque valve to establish the high pressure setting on the valve. In the event the setting of the valve 68 is exceeded by the pressure of fluid in the conduit 75, the valve stem 90 is moved downwardly as viewed in FIG. 4 to a position for supplying fluid under pressure from the charge conduit 72 to the control cylinder 60 to reduce the displacement and thereby control the pressure.

When the engine reaches a self-sustaining speed which permits starter cut-off, the speed is sensed and the power to the generator is disconnected so that the generator stops accelerating the engine. The magnetic trim is discontinued in the governor unit, and the tendency of the generator shaft to reduce speed drives the governor to a position which supplies fluid under pressure to the control cylinder 60 to move the swashplate 54 overcenter to reverse the rotation of the hydraulic unit 20 as illustrated in FIG. 2. While the speed of the generator shaft remains below a desired output speed, such as 12,000 rpm, for example, the governor valve ports the control cylinder 60 to the drain conduit 144 and the swashplate 54 moves back toward the position illustrated in FIG. 4 in an effort to bring the speed of the generator shaft up to the desired value.

When the starting mode is discontinued and the generating mode is initiated, the start solenoid valve 112 is deenergized and the torque valve 68 reverts to the low pressure setting. During the generating mode, the conduit 76 is normally at high pressure and the conduit 75 is normally at low pressure. However, in the event that the generator should start motoring, and pressure begins to rise in the conduit 75, the reverse torque valve is adapted to respond at the low pressure setting for purposes of reducing the displacement in the variable unit 19.

In the generating mode, when the speed of the engine shaft is less than that required to produce the desired speed of the generator shaft 11, the hydrostatic transmission drives the control gear G4 in a reverse direction to add speed in the differential. After the straight-through drive is attained, where the engine shaft 10 rotates at a speed to drive the generator shaft 11 at the proper speed with the control gear G4 stationary, the variable unit swashplace passes over-center in the direction toward the position illustrated in FIG. 4, and the fixed unit 20 functions as a pump, driven by the gear G4, rotating in the direction of the carrier to subtract speed in the differential.

If the output speed exceeds that desired, the flyweights 132 move the valve stem 134 to communicate the control cylinder 60 with the drain conduit 144 to increase the displacement and subtract more speed. If the output speed falls below the desired value, the flyweights allow the valve stem 134 to communicate the control cylinder 60 with the charge port 142, thereby to reduce displacement in the variable unit 19 and subtract less speed in the differential. Under these conditions, it will be understood that the variable unit, being driven at a constant speed, functions as a metering device which has the effect of slowing the unit 20 when the displacement is reduced, and increasing the speed of the unit 20 when the displacement is increased.

It will be understood that the system described has the advantages that the generator may be accelerated to its synchronous speed preparatory to the starting operation without significant load, the engine is started in a purely hydrostatic mode with a minimum of losses, and the drive operates at a high efficiency with most of the power transmitted mechanically in a constant speed generating mode. Only one of the hydraulic units needs to be of the variable displacement type and the size of the hydraulic units is minimized. The starting function is programmed by the magnetic trim control of the governor valve with a pressure limit determined by the torque valve. The constant speed generating mode is controlled by the governor responsive to output speed.

It should be understood that while the graphs in FIGS. 2 and 3 refer to specific speeds in which it is contemplated that the engine shaft may attain a speed in excess of 10,000 rpm, the system is not limited to such values. For example, in one system the maximum speed of the engine shaft is more like 7,500 rpm. In that situation, the values in the graphs of FIGS. 2 and 3 would be on the order of three-fourths of that shown.

I claim:
1. A starter-Drive for use between an aircraft engine and a generator to transmit power in either direction, between the engine and the generator, for driving the engine from the generator in a starting mode, and for driving the generator from the engine in a generating mode, comprising,
   a. a first shaft connectible with a generator,
   b. a second shaft connectible with an engine,
   c. a mechanical gear differential including one element rotatable with the first shaft,
   d. a variable ratio hydrostatic transmission including a first hydraulic unit connected for rotation with the first shaft, a second hydraulic unit connected in closed hydraulic circuit with the first hydraulic unit and connected for rotation with a second element in the differential, and means for varying the displacement of at least one of the hydraulic units,
   e. a first one-way clutch connecting the second hydraulic unit to the second shaft to drive the latter exclusively through the hydrostatic transmission when the generator is operated as a motor to drive the engine, and
   f. a second one-way clutch connecting a third differential element to the second shaft to transmit power from the engine to the generator through the differential and the hydrostatic transmission after the engine is started.

2. A starter-drive as defined in claim 1, wherein the displacement varying means is connected to vary the displacement of the first hydraulic unit in opposite directions from neutral.

3. A starter-drive as defined in claim 2, including means controlling the displacement varying means to vary the displacement in one direction from neutral during the starting mode and in the other direction from neutral during the generating mode.

4. A starter-drive as defined in claim 1, including a first conduit connecting the hydraulic units for supplying high pressure fluid from the first hydraulic unit to the second hydraulic unit during the starting mode and returning low pressure fluid during the generating mode, a second conduit connecting the hydraulic units for supplying high pressure fluid from the second hydraulic unit to the first hydraulic unit during the generating mode and returning low pressure fluid during the starting mode, a control valve responsive to pressure in the first conduit and controlling the displacement varying means to limit the pressure in the first conduit, and means for establishing a high pressure setting on the control valve during the starting mode and a low pressure setting during the generating mode.

5. A starter-drive as defined in claim 4, including means for establishing an intermediate pressure setting on the control valve for driving the engine without starting.

6. A starter-drive as defined in claim 1, including a governor valve responsive to speed of the first shaft and controlling the displacement varying means during the generating mode to provide constant speed of the first shaft regardless of variation in the speed of the second shaft.

7. A starter-drive as defined in claim 6, including selectively operable bias means controlling the governor valve during the starting mode to vary the displacement to bring the second shaft up to speed.

8. A starter-drive for transmitting power in either direction between an aircraft engine and a generator, comprising,
   a. a first shaft connectible to a generator,
   b. a second shaft connectible to an engine,
   c. a differential including a first gear rotatable with the first shaft, a second gear rotatable with the second shaft, and a control gear,
   d. a first hydraulic unit connected for rotation with the first shaft,
   e. a second hydraulic unit connected in closed hydraulic circuit with the first hydraulic unit and connected for rotation with the control gear,
   f. means for varying the displacement of the first hydraulic unit in opposite directions from neutral,
   g. a first one-way clutch connecting the second hydraulic unit to the second shaft to drive the latter exclusively through the hydraulic units when the generator is operated as a to start the engine while allowing the second shaft to overrun the second hydraulic unit after the engine is started,
   h. a second one-way clutch connecting the second shaft to transmit power from the second shaft to the second gear after the engine is started while allowing the second gear to overrun during starting,
   i. a governor valve responsive to the speed of the first shaft to control the displacement varying means after the engine is started to add or substract speed in the differential and provide constant speed of the first shaft despite variations in the speed of the second shaft, and
   j. selectively operable biasing means controlling the governor valve during engine starting to vary the displacement to bring the second shaft up to speed.

9. A starter-drive as defined in claim 8, including a first conduit connecting the hydraulic units for supplying high pressure fluid from the first hydraulic unit to the second hydraulic unit during engine starting and returning low pressure fluid during generating, a second conduit connecting the hydraulic units for supplying high pressure fluid from the second hydraulic unit to the first hydraulic unit during generating and returning low pressure fluid during starting, a control valve responsive to pressure in the first conduit and controlling the displacement to limit pressure, and means establishing a high pressure setting on the control valve during starting and a low pressure setting during generating.

* * * * *